United States Patent [19]

Myhre

[11] Patent Number: 5,119,680
[45] Date of Patent: Jun. 9, 1992

[54] TRANSDUCER MOUNTING APPARATUS

[75] Inventor: Kjell E. Myhre, Sun Valley, Calif.
[73] Assignee: MagneTek, Inc., Los Angeles, Calif.
[21] Appl. No.: 640,803
[22] Filed: Jan. 14, 1991
[51] Int. Cl.[5] .............................................. G01L 7/00
[52] U.S. Cl. ........................................ 73/756; 73/431
[58] Field of Search ................. 73/756, 726, 727, 724, 73/431; 338/4; 137/228

[56] References Cited

U.S. PATENT DOCUMENTS

| | | | |
|---|---|---|---|
| 2,618,978 | 11/1952 | Ragland | 73/756 |
| 4,005,847 | 2/1977 | Ekman | 73/756 |
| 4,901,761 | 2/1990 | Taylor | 73/756 |

Primary Examiner—Donald O. Woodiel
Attorney, Agent, or Firm—Faegre & Benson

[57] ABSTRACT

A pressure transducer mounting apparatus for mounting pressure transducers utilizes a collet secured to a base to selectively retain and release a a transducer from a receptacle. The receptacle is movable within the collet to provide pressure communication to the transducer when installed and to block pressure communication when the transducer is released. A retainer surrounds the collet and receptacle and moves the collet radially when the retainer moves axially. The retainer may be moved axially by a screw thread or an offset key hole cooperating with a projection on the base.

32 Claims, 4 Drawing Sheets

TRANSDUCER MOUNTING APPARATUS

BACKGROUND OF THE INVENTION

This invention pertains to the field of transducer mountings. In the past, as exemplified by FIGS. 1, 2 and 3, prior art adapters for flush mounted pressure transducers 10, 12, 14 exhibited a number of disadvantages. One disadvantage was the requirement to depressurize a system containing the transducer in order to replace a malfunctioning transducer. Another consideration was the release of fluids from the system in the course of replacing the transducer. Furthermore, ordinarily a wrench or other tool was required for installation or change of transducers in such other prior art adapters. In the prior art adapter 10, an external thread 16 connected adapter 10 to the system. A hexagonal driving surface 18 was used to rotate adapter 10 to engage or disengage threads 16. A transducer 20 was retained on adapter 10 by a cap 22 and sealed to a base 24 of adapter 10 by an O-ring 26.

Figure 2:
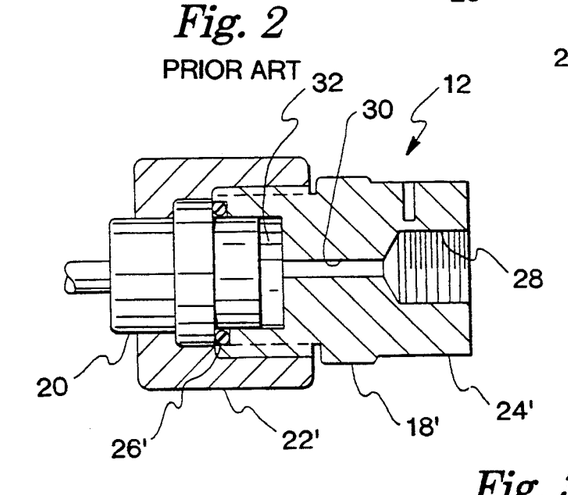
FIG. 2 shows a second embodiment of a prior art pressure transducer adapter.

Referring to adapter 12, it was sometimes found desirable to have internal threads 28 to attach adapter 12 to its associated system (not shown). Adapter 12 is similarly made up of a transducer 20 retained by cap 22' to base 24' (shown in section) and similarly sealed by O-ring 26'. It may be seen that threads 28 are in communication with a passageway 30 communicating with a chamber 32 to communicate pressure through base 24' to transducer 20.

Figure 3:
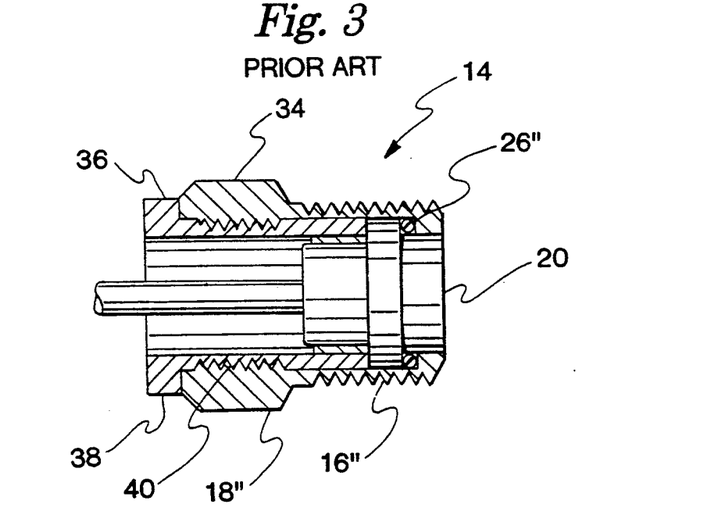
FIG. 3 shows a third embodiment of a prior art pressure transducer adapter.

Referring now to FIG. 3. adapter 14 has transducer 20 sealed against a first member 34 by an O-ring 26". A second member 36 preferably has a second hexagonal driving surface 38 thereon. First and second members 34, 36 preferably have interengaging threads 40 to retain members 34, 36 together.

Figure 1:
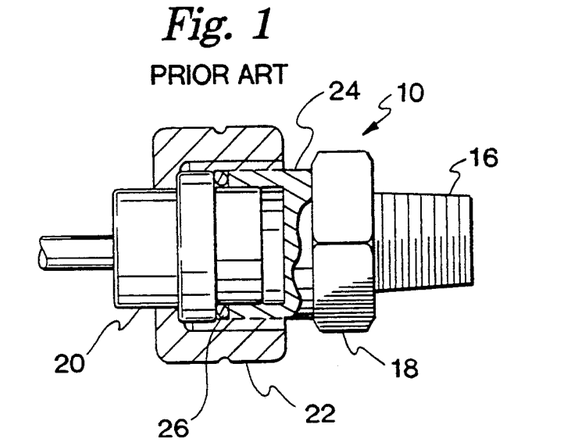
FIG. 1 shows a first embodiment of a prior art pressure transducer adapter.

In each of the prior art adapters 10, 12, 14 the transducer 20 is either not removable from the adapter or is removable, but provides no closure for the measurand or fluid upon removal of transducer 20 or adapter 10 or 12.

The present invention overcomes disadvantages of the prior art by providing for a simpler apparatus and method of installing and replacing pressure transducers, and further eliminates the requirement for the use of tools in such installation or replacement.

DETAILED DESCRIPTION

Figure 4:
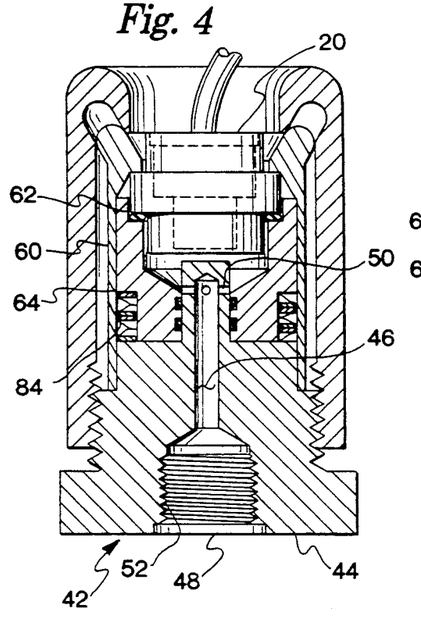
FIG. 4 shows a pressure transducer mounting apparatus in a first embodiment of the present invention with the transducer in an operating position.
Figure 5:
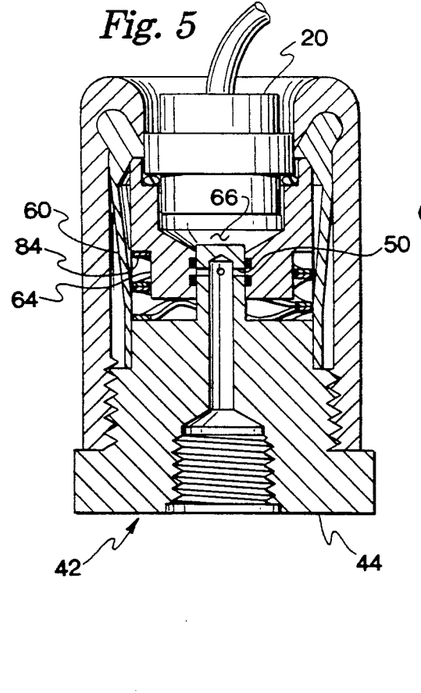
FIG. 5 shows the embodiment of FIG. 4 with the transducer in an alternate position, capable of being replaced.
Figure 6:
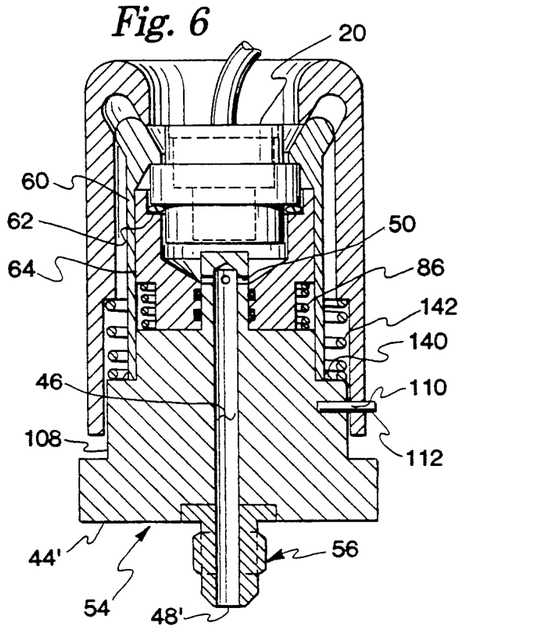
FIG. 6 shows another embodiment of the pressure transducer mounting apparatus of the present invention with the transducer in the operating position.
Figure 7:
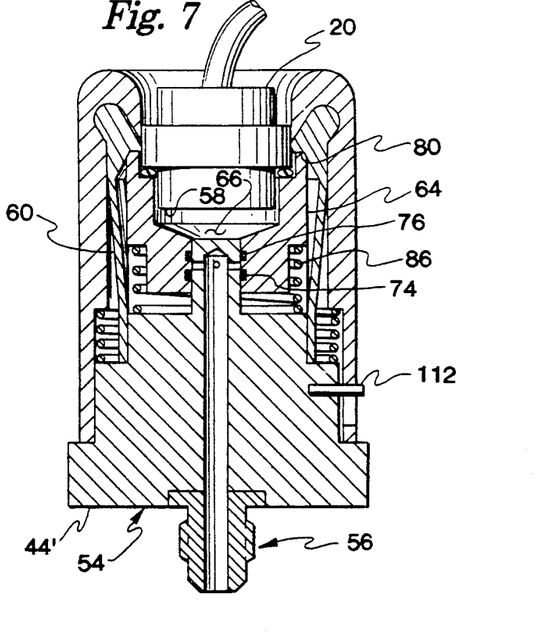
FIG. 7 shows the embodiment of FIG. 6 with the pressure transducer in an alternate position for releasing the transducer from the mounting apparatus.

Referring now to FIGS. 4 and 5, a first embodiment of the present invention may be seen. FIG. 4 shows transducer 20 installed in a mounting apparatus 42. FIG. 5 shows transducer 20 in an alternative position within apparatus 42, released for replacement. Apparatus 42 is adapted for replaceable mounting of pressure transducers of the type having a stepped cylindrical configuration as is shown in the figures. The apparatus includes a base 44 having a fluid path 46 communicating between a first end 48 and a second end 50 of the path 46. Base 44 further preferably has a coupling means for permanent coupling to a pressurized fluid at first end 48. In the embodiment of FIGS. 4 and 5, the coupling means comprises internal threads 52. Referring also to FIGS. 6 and 7, in an alternative embodiment 54 of apparatus 42, the coupling means for permanent coupling to a pressurized fluid at the first end of the fluid path may comprise a compression fitting 56.

FIGS. 4 and 6 show the apparatus with the transducer 20 in an operating condition. In this condition, the apparatus communicates a fluid from first end 48 of the fluid path to the second end 50 of the path 46 and beyond to the sensing portion of transducer 20. Transducer 20 is retained by a collet 60 in the operating condition. An O-ring 62 seals transducer 20 to a receptacle 64. Receptacle 64 is free to move between the position shown in FIGS. 4 and 6 and the position shown in FIGS. 5 and 7. Receptacle 64 is retained by the collet in the position shown in FIGS. 5 and 7.

As is shown in FIGS. 5 and 7, with receptacle 64 in the second position, allowing for replacement of transducer 20, the second end 50 of fluid path 46 is blocked from communication to the receptacle outlet 66 when transducer 20 is removed from the receptacle 64. It is to be understood that surface 58 of transducer 20 is pressure responsive and is exposed to the receptacle outlet 66 when transducer 20 is received in the receptacle 64 as is shown in FIGS. 4 and 6.

Figure 8:
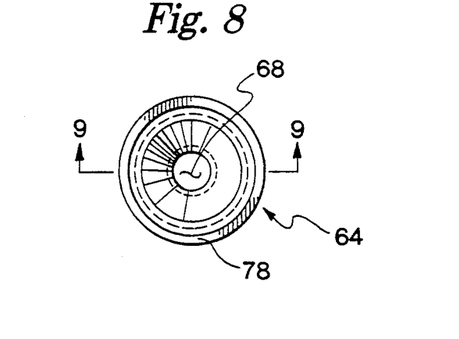
FIG. 8 is a top plan view of a receptacle useful in the practice of the present invention.
Figure 9:
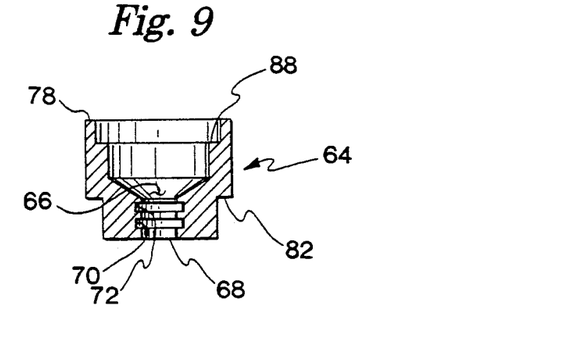
FIG. 9 is a section view of the receptacle of FIG. 8 taken along line 9—9.

Referring now also to FIGS. 8 and 9, receptacle 64 has a bore 68 which functions as an inlet coupled to the second end 50 of the fluid path 46 of base 44. Bore 68 preferably has a pair of recesses 70, 72 positioned to seal second end 50 of path 46 when receptacle 64 is in the position shown in FIGS. 5 and 7. The sealing is accomplished by a pair of O-rings 74, 76. Receptacle 64 preferably has a first surface set to interengage a first projection 80 on collet 60.

Figure 18:
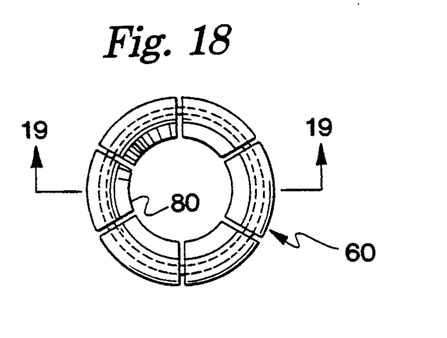
FIG. 18 is a top plan view of a collet useful in the practice of the present invention.
Figure 19:
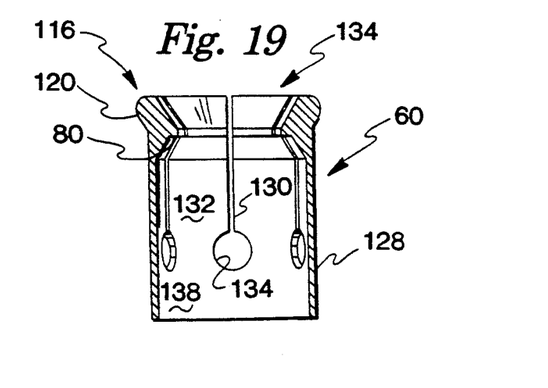
FIG. 19 is a section view of the collet of FIG. 18 taken along line 19—19.

Referring now also to FIGS. 18 and 19, the first projection 80 on collet 60 is preferably formed as a plurality of arcuate draw segments 80 formed integral with the collet 60.

Referring now again to FIGS. 8 and 9 as well as 4–7, receptacle 64 further has a second surface 82 for engaging a spring means 84. Spring means 84 may be a plurality of wave springs as shown in FIGS. 4 and 5, or it may be an alternative spring such as a coil spring 86 as shown in FIGS. 6 and 7. Spring means 84 verges receptacle 64 longitudinally away from base 44. This insures positive shutoff of the measurand when the collet is expanded to permit removal of transducer 20. Receptacle 64 further has a third surface 88 to engage O-ring 62 to seal transducer 20 to receptacle 64 in the operating position as shown in FIGS. 4 and 6. It is to be understood that O-rings 62, 74, 76 provide for sealing of receptacle outlet 66 while mounting apparatus 42 is in the operating position.

Figure 10:
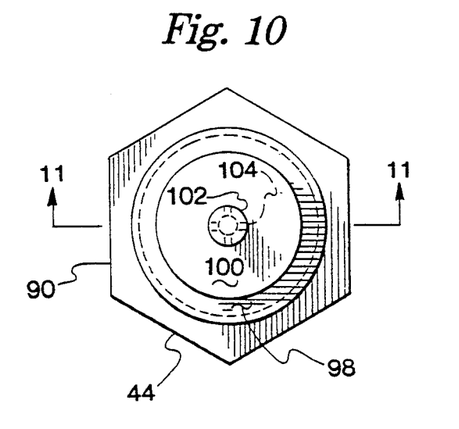
FIG. 10 is a top plan view of a first embodiment of a base useful in the practice of the present invention.
Figure 11:
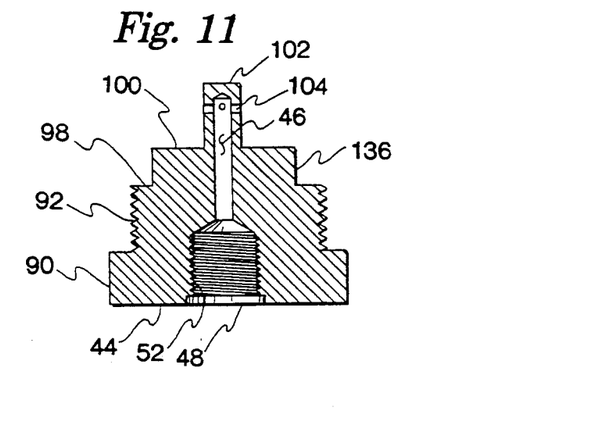
FIG. 11 is a section view of the base of FIG. 10 taken along line 11—11.

Referring now to FIGS. 10 and 11, a first embodiment 44 of the base may be seen. Base 44 preferably has a hexagonal periphery 90 by which base 44 may be secured to the system in which pressure is to be measured by threading base 44 to a threaded connection having threads mating with threads 52 at first end 48 of fluid path 46. Base 44 further has an externally threaded portion 92 adapted to threadably engaged with a mating portion 96 in a retainer 94. Base 44 further has first and second surfaces 98, 100. Surface 98 is preferably a radial land against which spring means 84 can react. Surface 100 acts as a stop for receptacle 64 in the operating position (see FIG. 4). Base 44 further has a longitudinal projection 102 preferably having transverse apertures or passageways 50 forming second end 50 of path 46. It is to be further understood that projection 102 preferably has a diameter closely interfitting bore 68 and receptacle 64.

Figure 12:
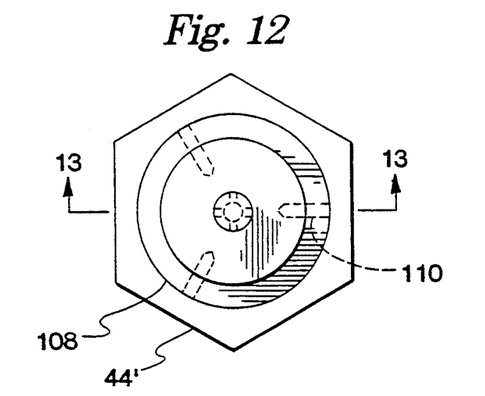
FIG. 12 is a top plan view of an alternative embodiment of a base useful in the practice of the present invention.
Figure 13:
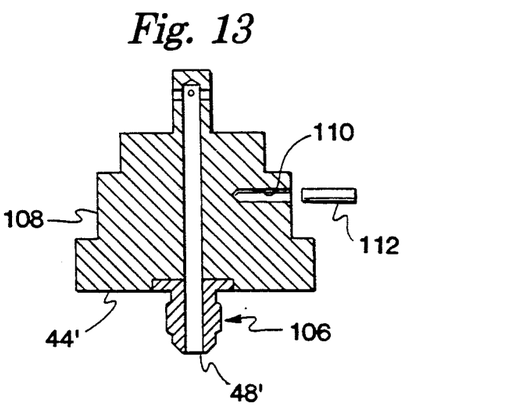
FIG. 13 is a section view of the base of FIG. 12 taken along line 13—13.

Referring now to FIGS. 12 and 13, an alternative embodiment of base 44' may be seen. In place of internal threads 52 at first end 48 of path 46, base 44' has a compression fitting 106 at first end 48'. Fitting 106 may be of a conventional type L- and is intended to permanently secure base 44' to the system in which pressure is to be measured. In place of thread 92, base 44' preferably has a smooth outer surface 108 with one or more blind holes 110 sized to receive and retain a drive or roll pin 112.

Figures 14, 15, 16, 17:
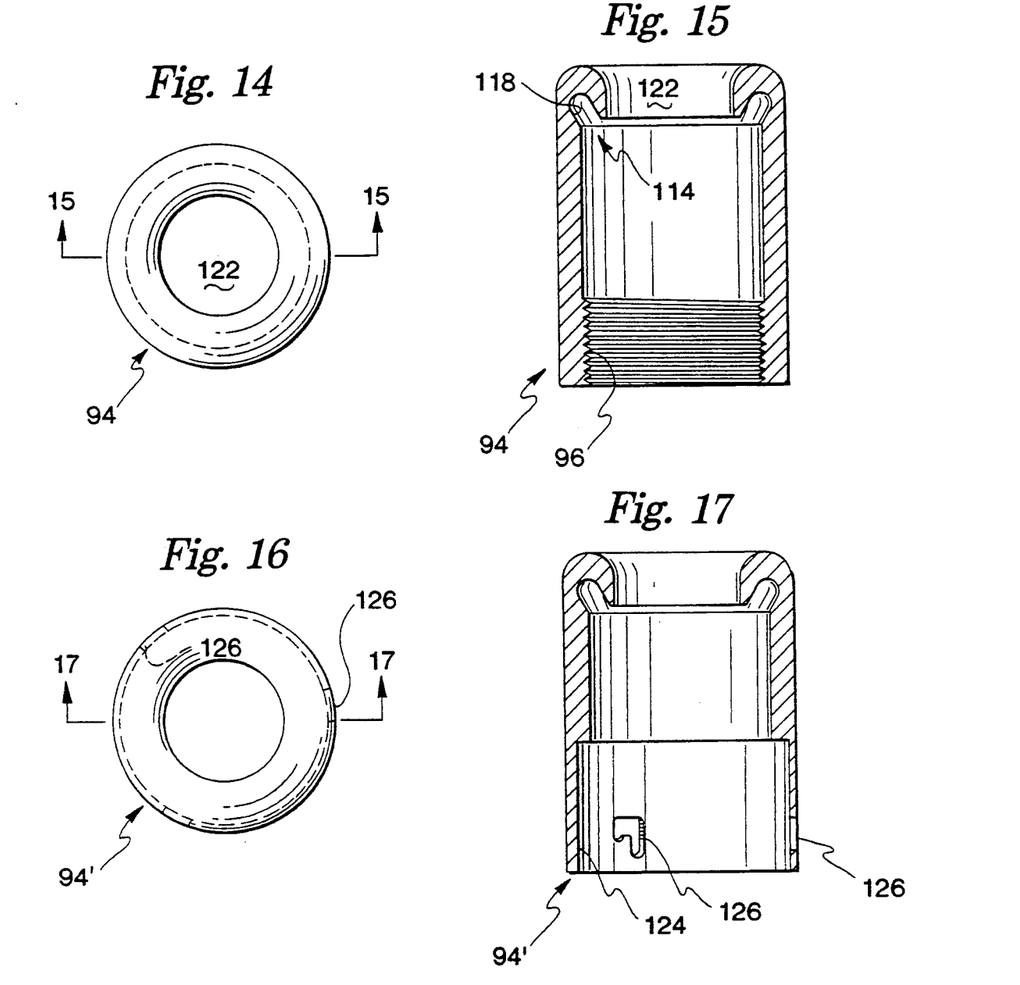
FIG. 14 is a top plan view of a retainer useful in the practice of the present invention in combination with the base of FIGS. 10 and 11.
FIG. 15 is a section view of the retainer of FIG. 14 taken along line 15—15.
FIG. 16 is a top plan view of an alternative embodiment of the retainer useful in the practice of the present invention in combination with the base of FIGS. 12 and 13.
FIG. 17 is a section view of the retainer of FIG. 16 taken along line 17—17.

Referring now to FIGS. 14 and 15, retainer 94 may be seen. Retainer 94 has a head portion 114 to matingly interfit with a corresponding portion 116 of collet 60. More particularly, head portion 114 includes a generally conically oriented recess 118 for receiving a conically oriented projection 120 on head portion 116 of collet 60.. As may be noted by comparing FIGS. 4 and 6 with 5 and 7, longitudinal movement of the outer portion or retainer 94 will cause radial movement of the head portion of collet 60. Furthermore, it is to be noted that longitudinal movement of retainer 94 towards base 42 will result in outward radial movement of head portion 116, while longitudinal movement of retainer 94 away from base 42 will result in radially inwardly directed movement of the head portion 116 of collet 60 by virtue of the interaction of the corresponding mating recess 118 with the projection 120. It may be noted that retainer 94 preferably has a bore 122 in head portion 114 of sufficient diameter to Permit passage of transducer 20 therethrough. This permits replacement of transducer 20 without separation of retainer 94 from mounting apparatus 42.

Referring now to FIGS. 16 and 17, an alternative embodiment of retainer 94' may be seen. This retainer is suitable for use in alternative apparatus 54 shown in FIGS. 6 and 7. In retainer 94', threads 96 are replaced by a smooth wall 124. One or more offset keyhole apertures 126 are provided in wall 124. Apertures 126 permit controlled and limited movement of retainer 94' with respect to base 44' through interengagement of pins 112 in aperture 126.

Referring now to FIGS. 18 and 19, collet 60 preferably has a smooth wall cylindrical portion 128 partially interrupted by slots 130. Slots 130 form a plurality of longitudinally oriented radially flexible spring portions 132 in wall 128 of collet 60. The spring portions 132 preferably have a free end 134 with the first projection or draw segment 80 disposed thereon. The opposite end of spring portion 132 may have enlarged reliefs or holes 134 in wall 128 to aid in the spring action of portion 132.

Collet 60 is preferably secured to base 44 by suitable attachment between the interior wall 128 and cylindrical surface 136 (see FIGS. 11 and 19), such as by "sweat" brazing or welding in region 138 or by a fillet weld 140 as is shown in FIG. 6 or by any other suitable means. One suitable material for the parts of mounting apparatus 42 is 17-4 precipitation hardenable stainless steel. Using such material, the collet and receptacle are preferably heat treated to condition 900 for appropriate stability and spring action. The "as-annealed" condition is believed suitable for the remaining parts. An alternative stainless steel may be 303 type with appropriate heat treatment to achieve desired properties. For low pressure, non-critical applications, other materials may be suitable, such as plastic. In any event, all of the materials including the O-rings used in apparatus 42 are to be compatible with the measurand.

In operation, retainer 94 is displaced either by a helical (screwing) action or by a press-and-twist action moving retainer longitudinally toward base 44. Such movement will cause interengagement of the conically oriented recess 118 with the conically oriented projection 120 radially outwardly displacing the head portion 116 of collet 60, freeing transducer 20 to move longitudinally away from base 44. As transducer 20 moves away from base 44, spring means 84 urges receptacle 64 longitudinally away from base 44, closing second end 50 of fluid path 46 to prevent continued release of the measurand from the system to be measured.

To install a new transducer 20, the replacement transducer is placed in the position shown in FIG. 5 or 7, and transducer 20 is preferably manually urged longitudinally toward base 44. This will compress and seal the receptacle outlet 66 via O-ring 62, and will subsequently cause movement of receptacle 64 longitudinally toward base 44, acting against spring means 84, until receptacle 64 is preferably seated on surface 100 of base 44, thus enabling communication from passage or fluid path 46 through the second end 50 of salient extension 105 of base 44 into the receptacle outlet region 66, permitting transducer 20 to be exposed to the pressure to be measured. While the transducer 20 is held in this position, retainer 94 is manually moved longitudinally away from base 44, either by helical action along interengaging threads 92, 96, or via a twist-and-pull action of retainer 94' with respect to base 44' as apertures 126 move relative to pins 112. It may be noted that a second spring 142 may be utilized to urge retainer 94' away from base 44'. As retainer 94 moves longitudinally away from base 44, the head portion 116 of collet 60 is permitted and urged to move radially inward to retain transducer 20 in the operating positions as shown in FIGS. 4 and 6.

This pressure transducer mounting apparatus may thus be seen to have a base 44 with a fluid path 46 communication between first end 48 and second end 50 of the base and further, having a coupling means such as threads 52 or compression fitting 56 to permanently couple the base to a pressurized fluid at the first end 48 of path 46. The apparatus 42 further has a transducer receptacle means 64 with an inlet 68 coupled to the second end 50 of fluid path 46 in the base 44. The receptacle 64 also preferably has an outlet 66 for receiving a pressure transducer 20. The receptacle 64 is movable with respect to base 44 to selectively communicate pressure from the fluid path 46 at end 50 the receptacle means outlet 66 when a pressure transducer is received in the receptacle 64. The receptacle 64 is movable to block communication of the fluid pressure to the receptacle means outlet 66 when the pressure transducer 20 is absent from the receptacle 64. The apparatus 42 also has a transducer retaining means 94 interengaging base 44 and receptacle 64 for selectively retaining a transducer 20. The retainer 94 is positionable to a first position for retaining transducer 20 in the receptacle means 64 and is also positionable to a second position for releasing transducer 20 from the receptacle means 64. Apparatus 42 is operative to communicate fluid pressure to transducer 20 when the retaining means 94 is in the first position and to block fluid pressure by the receptacle means 64 when the retaining means 94 is in the second position.

The retainer 94 preferably comprises a generally cylindrical collet surrounding receptacle 64 and having a radially inwardly directed first projection 80 for retaining the transducer 20 and a radially outwardly directed second projection 120 interengaged with a generally cylindrical collet retaining means 94 which surrounds the collet and has means 118 for engaging the second projection 120 of the collet. The collet retaining means 94 also has threads 96, or a push-and-turn apparatus 110, 126 to engage the base approximate one end of the collet retaining means 94. The collet retaining means end collet are selectively movable to the first position where in the first projection 80 of the collet, retains transducer 20 in the receptacle 64 and the second position where in the first projection 80 releases transducer 20 from the receptacle means.

The invention is not to be taken as limited to all of the details thereof as modifications and variations thereof may be made without departing from the spirit or scope of the invention.

What is claimed is:

1. A pressure transducer mounting apparatus for replaceable mounting of pressure transducers of the type having a stepped cylindrical configuration, the mounting apparatus comprising:
    a) a base having:
        i) a fluid path communicating between a first end and a second end thereof and
        ii) a coupling means for permanent coupling to a pressurized fluid at the first end of the path;
    b) transducer receptacle means having an inlet coupled to the second end cf the fluid path of the base and an outlet for receiving a pressure transducer and movable with respect to the base for:
        i) selectively communicating the pressure from the fluid path at the second end of the path to the receptacle means outlet when a pressure transducer is received in the receptacle means, and
        ii) blocking communication of the fluid pressure to the receptacle means outlet when the pressure transducer is absent from the receptacle means; and
    c) transducer retaining means interengaging the base and the receptacle means for selectively retaining the transducer and positionable to:
        i) a first position for retaining the transducer in the receptacle means, and
        ii) a second position for releasing the transducer from the receptacle means
wherein fluid pressure is communicated to the transducer when the retaining means is in the first position and fluid pressure is blocked by the receptacle means when the retaining means is in the second position.

2. The pressure transducer mounting apparatus of claim 1 wherein the transducer retaining means comprises:
    a) a generally cylindrical collet surrounding the receptacle means and having:
        i) a radially inwardly directed first projection for retaining the transducer and
        ii) a radially outwardly directed second projection; and
    b) a generally cylindrical collet retaining means surrounding the collet and having means for interengaging the base proximate one end thereof and means for interengaging the second projection of the collet distal of the one end of the collet retaining means, the collet and retaining means selectively movable to:
        i) the first position wherein the first projection of the collet retains the transducer in the receptacle means, and
        ii) the second position wherein the first projection releases the transducer from the receptacle means.

3. The pressure transducer mounting apparatus of claim 2 wherein the receptacle means is retained by the first projection of the collet when the retaining means is in the second position.

4. The pressure transducer mounting apparatus of claim 1 wherein the transducer retaining means further comprises locking means for preventing removal of the transducer retaining means from the base.

5. The pressure transducer mounting apparatus of claim 3 wherein the first projection comprises a plurality of arcuate jaw segments formed integral with the collet.

6. The pressure transducer mounting apparatus of claim 5 wherein each of the plurality of arcuate jaw segments is disposed at a free end of a longitudinally-oriented radially flexible spring portion of the collet.

7. The mounting apparatus of claim 4 wherein the retaining means further comprises a resilient biasing means for urging the retaining means longitudinally away from the base.

8. The pressure transducer mounting apparatus of claim 1 wherein the receptacle means further comprises spring means for urging the receptacle means longitudinally away from the base.

9. The pressure transducer mounting apparatus of claim 1 wherein the coupling means comprises a threaded connection.

10. The pressure transducer mounting apparatus of claim 1 wherein the base further comprises a salient extension having a longitudinal passageway in communication with the fluid path and a transverse opening between the longitudinal passageway and the exterior of the base at the second end of the path.

11. The pressure transducer mounting apparatus of claim 10 wherein the receptacle means inlet comprises an opening conforming to the cross-section of the salient extension.

12. The pressure transducer mounting apparatus of claim 11 wherein the receptacle means inlet further comprises first seal means for sealing the transducer receptacle means inlet opening to the salient extension.

13. The pressure transducer mounting apparatus of claim 12 wherein the first seal means comprises a pair of O-rings positioned to:
   i) seal an interstice between the inlet opening and the salient extension for preventing leakage along the interstice,
   ii) permit transmission of fluid pressure from the transverse opening to the receptacle means outlet when the pressure transducer is received in the receptacle means, and
   iii) block transmission of fluid pressure in the transverse opening from reaching the receptacle means outlet when the pressure transducer is absent from the receptacle means.

14. The pressure transducer mounting apparatus of claim 13 wherein the receptacle means outlet further comprises second seal means for sealing the receptacle means outlet to the pressure transducer.

15. The pressure transducer mounting apparatus of claim 14 wherein the second seal means comprises an O-ring positioned at the receptacle means outlet and adapted to seal an annular boundary at the receptacle means outlet when a pressure transducer is received in the receptacle means.

16. Mounting apparatus for on-line replacement of pressure transducers comprising:
   a) a base permanently connected to a source of fluid pressure;
   b) a receptacle means carried by the base for receiving a pressure transducer and movable to:
      i) a first position wherein a pressure communication path is established from the base through the receptacle means to the pressure transducer and
      ii) a second position wherein the pressure communication path from the base to the pressure transducer is interrupted by the receptacle means;
   c) a retaining means carried by the base for selectively retaining the pressure transducer in the mounting apparatus in the first position; and
   d) first spring means located between the base and the receptacle means for urging the receptacle means to the second position in the absence of the pressure transducer.

17. The mounting apparatus of claim 16 wherein the retaining means is movable with respect to the base.

18. The mounting apparatus of claim 17 wherein the retaining means further comprises second spring means for urging the retaining means to a transducer retaining position.

19. The mounting apparatus of claim 18 wherein the base is characterized by a longitudinal axis and the retaining means comprises an inner portion and an outer portion movable with respect to each other, and wherein the inner portion is movable radially transverse to the base between a radially inward first position and a radially outward second position.

20. The mounting apparatus of claim 19 wherein the outer portion is longitudinally movable with respect to the base.

21. The mounting apparatus of claim 20 wherein longitudinal movement of the outer portion selectively blocks and enables the radially transverse movement of the inner portion.

22. The mounting apparatus of claim 21 wherein the inner portion comprises a generally cylindrical collet having a plurality of radially inwardly projecting jaws.

23. The mounting apparatus of claim 22 wherein the inner portion has a generally conically-oriented projection and the outer portion has a corresponding generally conically-oriented recess for receiving the conically-oriented projection of the inner portion such that longitudinal movement of the outer portion with respect to the base causes radial movement of the inner portion.

24. A method of replacing a generally cylindrical pressure transducer in a permanently installed mounting apparatus comprising the steps of:
   a) moving a transducer retaining means for retaining a pressure transducer relative to a base from a transducer-retaining position to a transducer-releasing position;
   b) moving a transducer receptacle means for receiving the pressure transducer in the mounting apparatus from a pressure-communicating position to a pressure-blocking position;
   c) removing the pressure transducer from the mounting apparatus;
   d) inserting a new pressure transducer in the mounting apparatus;
   e) moving the transducer receptacle means to the pressure-communicating position such that pressure is communicated to the pressure transducer; and
   f) moving the transducer retaining means to the transducer retaining position such that the pressure transducer is retained in the mounting apparatus.

25. The method of claim 24 wherein step a) comprises moving the retaining means longitudinally of the base and radially outwardly with respect to the transducer.

26. The method of claim 24 wherein step b) comprises moving the receptacle means longitudinally with respect to the base.

27. The method of claim 24 wherein the transducer retaining means comprises an outer portion longitudinally movable with respect to the base and an inner portion having retention jaws radially movable with respect to the pressure transducer.

28. The method of claim 24 wherein the transducer receptacle means is spring-biased toward the pressure-blocking position and step d) further comprises moving the new pressure transducer longitudinally towards the base against the spring bias to the pressure-communicating position.

29. The method of claim 24 wherein a first portion of the transducer retaining means is spring biased longitudinally away from the base.

30. The method of claim 29 wherein a second portion of the transducer retaining means is spring biased to move radially transversely of the base from the transducer-releasing position to the transducer-retaining position.

31. The method of claim 24 wherein the transducer retaining means comprises an outer portion longitudinally movable with respect to the base and an inner portion radially movable with respect to the base and wherein the inner and outer portions have mating conical surfaces and further wherein step a) comprises the moving the outer portion longitudinally of the base such that the mating conical surfaces drive the inner portion radially from the transducer-retaining position to the transducer-releasing position.

32. The method of claim 24 wherein the transducer retaining means comprises an outer portion longitudinally movable with respect to the base and an inner portion radially movable with respect to the base and wherein the inner and outer portions have mating conical surfaces and further wherein step a) comprises the moving the outer portion longitudinally of the base such that the mating conical surfaces drive the inner portion radially from the transducer-releasing position to the transducer-retaining position.

* * * * *

UNITED STATES PATENT AND TRADEMARK OFFICE
CERTIFICATE OF CORRECTION

PATENT NO. : 5,119,680

DATED : June 9, 1992

INVENTOR(S) : Kjell E. Myhre

It is certified that error appears in the above-identified patent and that said Letters Patent is hereby corrected as shown below:

Column 6, line 58, delete "3" and insert --2--

Signed and Sealed this

Seventh Day of September, 1993

Attest:

BRUCE LEHMAN

Attesting Officer

Commissioner of Patents and Trademarks